United States Patent [19]

Aiello

[11] Patent Number: 5,518,405
[45] Date of Patent: May 21, 1996

[54] MUSICAL POTTY TRAINING DEVICE

[76] Inventor: Marianna C. Aiello, 151 Pezold Dr., St. Charles, Mo. 63304-7930

[21] Appl. No.: 404,306

[22] Filed: Mar. 14, 1995

[51] Int. Cl.[6] ................................................ G09B 19/00
[52] U.S. Cl. ........................................ 434/258; 4/902
[58] Field of Search .................... 434/247, 258; 4/902, 314, 661

[56] References Cited

U.S. PATENT DOCUMENTS

| | | | |
|---|---|---|---|
| 2,766,716 | 10/1956 | Mackey | 4/902 X |
| 2,788,764 | 4/1957 | Headler | 4/902 X |
| 3,020,528 | 2/1962 | Swanson, Jr. et al. | 340/235 |
| 3,364,478 | 1/1968 | Waard | 434/247 X |
| 3,680,151 | 8/1972 | Boardman et al. | 434/247 X |
| 3,691,980 | 9/1972 | Shastal | 116/67 |
| 5,111,113 | 5/1992 | Chu | 315/210 |
| 5,253,375 | 10/1993 | Prosper | 4/661 |

*Primary Examiner*—Gene Mancene
*Assistant Examiner*—Jeffrey A. Smith

[57] ABSTRACT

A training device for entertaining and encouraging a person to sit comfortably for a period of time while toilet training, is the subject of the present invention. The device comprises, a chair member having a seat portion having a central opening therein for the passage of excrement, a back portion attached to the seat portion, and a pair of arms being attached to the seat portion and the back portion also, an electrically powered music box is attached to the chair member for producing a musical tune, an activator for manually activating the music box attached to the chair member, the activator being in electrical communication with the music box and comprising an electrical switch having a music activator button for manually actuating the switch, the button being located on an exterior surface of at least one of the arms. Light emitting diodes are attached to the chair member, the light emitting diodes being in electrical communication with the music box to cause the light emitting diodes to blink to correspond to the musical tune. An on/off switch is attached to the chair member and in electrical communication with the music box to permit control by an adult supervisor.

5 Claims, 1 Drawing Sheet

DETAIL OF
ITEM NO. 18

MUSICAL POTTY TRAINING DEVICE

FIELD OF INVENTION

This invention relates to a child potty training device, which utilizes music and blinking LED lights for an entertainment and educational potty training device for the physically advantaged and physically impaired child.

BACKGROUND

Among the various musical potty training devices in the prior art, most utilize a commercially available music box mechanism for producing desired musical tones. Some devices were battery operated, see for example, U.S. Pat. No. 3,691,980, issued Sep. 19, 1972 to Shastal, while others are spring actuated as in U.S. Pat. No. 3,020,528, issued Feb. 6, 1962 to Swanson, Jr., et al. Several patents disclose a combination of music box, lights and control switch, such as U.S. Pat. No. 5,111,113, issued May 5, 1992 to Chu. The present potty training device combines a versatile chair type potty training device wherein the musical device to be actuated is in the form of an electrically-motorized mechanism. The actuating motor is battery operated in an energizing circuit including two normally open-circuited electrical switches, the first of which is affixed in one arm of the potty training device and is actuated by child pressing an activation device such as a music activator button. The music activation device in one arm of the chair, when pressed onsets the music switch, which initiates a musical tune, and when the child presses the other arm music activator device, the music will stop and begin a new tune. The battery operated commercially available music box consisting of lead wires which run from music sensors to blinking LED lights to the battery case, music box and control switch, is available commercially, for example from Dicker International of New York, N.Y. The blinking LED lights which correspond to the musical tune is controlled by an on/off switch for a supervisory adult to use as a control mechanism. The control switch allows the flow of electricity but doesn't promote the music until the child initiates the activation device.

The prior art potty training devices rewarded the child with a sound device after excrementing into a receptacle. The present potty training device is not focused on the reward aspect, but is centered around the entertaining and educational aspects that the present device produces for the physically advantaged and/or physically impaired child. The disadvantage to the prior inventions is that the child had to sit for a prolonged period of time, and only after excrementing in a receptacle was rewarded with a tune and parental notification. All of the prior art devices mentioned above were of one type, where my potty training device can be of several collective types embodied in one unit. There is now provided a versatile chair type potty training device having musical tunes, which can be changed by the child, blinking LED lights which correspond to the musical tune, plus other features not included in the prior art.

SUMMARY

These and other advantages are achieved by a musical potty training device which comprises, in combination: a chair member having a seat, a back and arms, wherein the seat has a central opening for the passage of excrement; a battery powered music box attached to the outside back side of the chair member; a music switch located in one arm of the chair member with electrical lead wires to activate the blinking light emitting diodes (LED's) attached to either arm of the chair member, the LED's electrically connected in the music box to cause the LED's to blink to correspond to the musical tune. The music box has an on/off switch to permit control by an adult supervisor. The chair member may be removably mounted on an adult toilet seat to permit excrement to pass directly into the toilet, or is removably mounted on a base unit which houses a removable receptacle for receiving excrement. The chair member may have a central opening lid cover which allows device to be used in combination as a floor or toilet top chair model.

Figure 2:
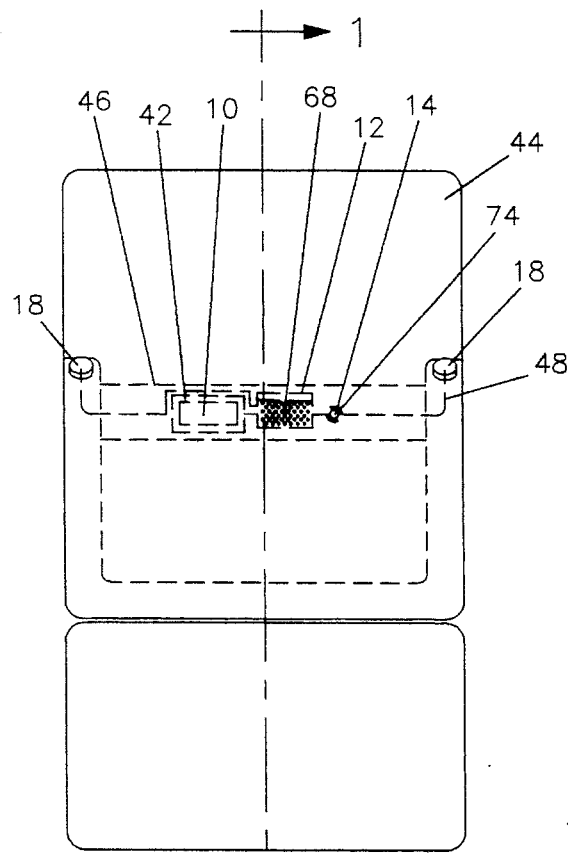
FIG. 2 is an back side view of the potty training device
Figure 2:
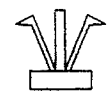

The drawings contain the following elements:

Plastic Cover (6); LED Lights (8); Battery Case (10); Music Box (12); Control Switch (14); Music Switch (16); Music Activator Button (18); Lid Cover (22); Fasteners (26); Removable Receptacle (28); Base Unit (30); Molded Restings (32); Hinges (34); Light Reflector Plate (36); Central Opening (38); Battery Case Compartment (42); Back Side (44); Encasement (46); Lead Wires (48); Hinge Bar (50); Lip (52); Footings (56); Seat (58); Plastic Cover Groove (60); Arm (66); Encasement Music Perforation (68); Channel (70); Switch Opening in Encasement (74).

DETAILED DESCRIPTION

Before turning to a detailed description of the drawings, perhaps an overview of the present invention would be desirable. The present potty training device combines a versatile chair type potty training device wherein the musical device to be actuated is in the form of an electrically-motorized mechanism. The actuating motor is battery operated in an energizing circuit including two normally open-circuited electrical switches, the first of which is affixed in one arm of the potty training device and is actuated by child pressing an activation device such as a musical switch. The activation device in one arm of chair will play a musical tune, and when the child presses the other arm activation device, the music will stop and begin a new tune. The battery operated commercially available music box consists of lead wires which run from the music switches to blinking LED lights to the battery case, music box and control switch. The blinking LED lights which correspond to the musical tune is controlled by an on/off switch for a supervisory adult to use as a control mechanism. The control switch allows the flow of electricity but doesn't promote the music until the child initiates the activation device.

My potty training device is in combination a toilet top model, floor model and a chair model for the physically advantaged and/or physically impaired child to entertain and educate, regardless of child's abilities or handicaps. The base unit is used in combination with a receptacle holder for the floor model or turned over and used as a step stool, among other things. This potty training device will encourage the physically advantaged and/or physically impaired child to sit comfortably for a prolonged period of time playing with the musical activator buttons. While the child is sitting still and activating the musical tone by pressing the music activator buttons, this will allow the child to become comfortable with the potty training device, and promote the child to excrete into the toilet or receptacle, depending on the mode of the potty training device chosen.

This potty training device can be made larger, for older children with disabilities and handicaps, to promote potty training enjoyment for them as well. The potty training device may include other attachments, adjustments and accessories for the needs of the physically advantaged and/or physically impaired child. This potty training device may be produced using wood, plastic or other materials which allows versatility. The toilet top model promotes sanitary means of depositing the child excrementation straight into the toilet and discarded. The floor model will assist the parent when the parent needs to use the facility, and the physically advantaged and/or physically impaired child wants to do their duty as well. The floor model will house a removable receptacle for this function in the base unit attached to the chair member, which will require parental intervention for the sanitary disposal and cleaning of the removable receptacle. The physically advantaged and/or physically impaired child may also use the potty training device in combination as a toilet top or floor model chair while sitting when lid cover is over the central opening. The basic function of the training device is to keep the interest of the physically advantaged and/or physically impaired child while performing their potty training needs, for entertaining and educational purposes which requires the child to sit still for prolonged amounts of time during this period, or to use for amusement.

Figure 3:
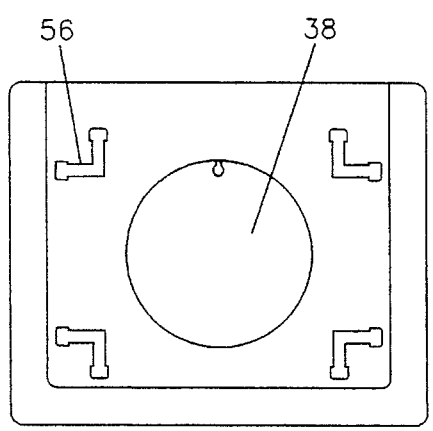
FIG. 3 is a underside of seat view
Figure 1:
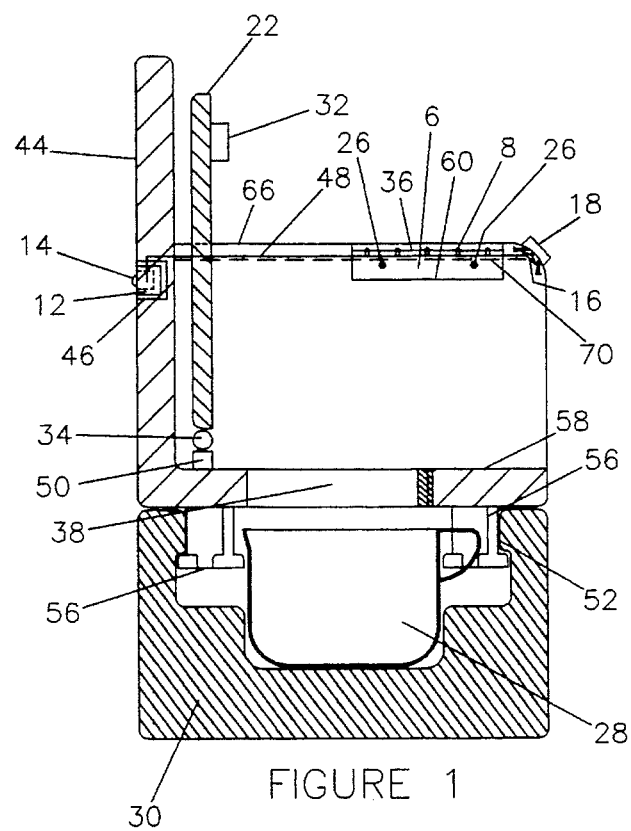
FIG. 1 is a cross sectional view of seat and base unit

Turning now to the drawings, FIG. 1 is an cross sectional view of a chair member and a base unit (30), comprising a chair member having a central opening (38) in a seat (58), positioned by footings (56) on under side of seat (58) as shown in FIG. 3. The footings (56) fastens onto a lip (52) in base unit (30). The base unit (30) houses a removable receptacle (28). A lid cover (22) sets on molded restings (32) that overlays central opening (38), and is fastened by a interlocking hinge (34) connected to a hinge bar (50) on the chair member. An arm (66) of chair member houses a channel (70) for lead wire (48), and contains a perforated light reflector plate (36) for illuminating housed blinking LED lights (8), and a plastic cover groove (60) for the plastic cover (6) to be inset by fasteners (26). The lead wire (48) consists of two separate ends, containing a music switch (16), which runs along channel (70) to blinking LED lights (8), then continues through the inside arm (66) to a battery case (10), a music box (12) and a control switch (14) encased in a encasement (46) on the back side (44) of the chair member. The music switch (16) is activated by music activator button (18) on arm (66) of chair member.

FIG. 2 is a back side (44) view of the chair member showing music activator button (18), lead wire (48), control switch (14) protruding through the switch opening in encasement (74), music box (12) with encasement music perforation (68), to the battery case (10) enclosed in the battery case compartment (42), all encased in the encasement (46) affixed to the back side (44) of the chair member.

FIG. 3 is the under side view of the chair member. As described in FIG. 1 the footings (56) in relationship to the central opening (38), fasten to the base unit (30).

Turning again to the drawings, FIG. 1 is an cross sectional view of a chair member and a base unit (30) made out of plastic, wood, or other materials, and can take on a variety of shapes, sizes, colors, etc. The chair member has a central opening (38) in a seat (58), positioned by footings (56) on under side of seat (58) as shown in FIG. 3. The footings (56) in relationship to the central opening (38) fastens onto a lip (52) in base unit (30) as well as an adult toilet seat. The base unit (30) houses a removable receptacle (28) so the child's excrement can be easily discarded, or can also be used in opposite position as a child's step stool. A lid cover (22) sets on molded restings (32) that overlays central opening (38), so the child is able to use the device as a chair instead of a toilet training device. The lid cover (22) is fastened by an interlocking hinge (34) connected to a hinge bar (50) on the chair member. An arm (66) of chair member houses a channel (70) for lead wire (48), and contains a perforated light reflector plate (36) for illuminating housed blinking LED lights (8), a plastic cover groove (60) for the plastic cover (6) to be inset by fasteners (26) for lights to show through. The lead wire (48) consists of two separate ends, containing a music switch (16), which runs along channel (70) to blinking LED lights (8), then continues through the inside arm (66) to a battery case (10), a music box (12) and a control switch (14) encased in a encasement (46) on the back side (44) of the chair member. The music switch (16), which sets the play for a variety of tunes, is activated by music activator button (18) on arm (66) of the chair member.

FIG. 2 is a back side (44) view of the chair member showing the music activator button (18), which the child presses to activate the musical tunes; lead wire (48), control switch (14) (for parent to use to turn on or off the power for the music activation) which protrudes through switch opening in encasement (74), music box (12) with encasement music perforation (68) for the music to project from, to battery case (10) enclosed in battery case compartment (42), all enclosed in the encasement (46) affixed to back side (44) of the chair member. The encasement (46) can take on a variety of shapes, sizes, colors, attachments, and placement where the battery case (10), music box (12) and control switch (14) can be housed. The chair member can be made of plastic, wood or other material and take on a variety of shapes, sizes, colors, attachments, objects and allow for future adaptability.

FIG. 3 is the under side view of the chair member. As described in FIG. 1 the footings (56) in relationship to the central opening (38), fasten to the base unit (30) and adult toilet seat.

CONCLUSION, RAMIFICATIONS, AND SCOPE OF INVENTION

Thus the reader will see that the musical potty training device provides a highly versatile, entertaining, educational, amusing, yet economical device that can be used by physically advantaged and/or physically impaired children.

While my above description contains many specifities, these should not be construed as limitations on the scope of the invention, but rather as an exemplification of one preferred embodiment thereof. Many other variations are possible. For example, the potty training device instead of the encasement as described above, can be designed for placement elsewhere. The potty training device can be made larger for older children with or without handicaps, or the seat may be cushioned for more comfort. The device can be modified for different children impairments, such as, musical vibrations for the blind; colored blinking lights for the deaf; different objects on the arms of the potty training device for the mentally handicapped; head braces, arm and back supports and safety straps for the muscular deficient; to name only a few. Various other attachments for the physically impaired child can be secured to this potty training device in either the toilet top, floor model or chair type mode that has not been described above. This potty training device is easier to market than others, has a long life cycle, is durable, comfortable, attractive in appearance, easily supported on standard toilet seat, is practical, and is superior to other products on the market. Accordingly, the scope of the invention should be determined not by the embodiment(s) illustrated, but by the appended claims and their legal equivalents.

For example, the musical potty training device can be made of other materials, be made to expand larger for older children, take other shapes, such as circular, oval, and the like. The blinking LED lights and other objects located on, in, around the arms of the chair can be assorted, singular or multiple, colored, standard, etc. The musical device can play one tune or various tunes. The base unit can have a holder embedded in it for books or toys or other objects. The seat cover can be of various shapes, size, colors, embodiments, and material, to name a few. Most important, the potty training device can be equipped with various braces, attachments and fixtures that can permit a physically impaired child to experience and enjoy potty training.

While I have illustrated and described herein only one form in which my potty training device can conveniently be embodied in practice, it is to be understood that this embodiment is given by way of example only and not in a limiting sense. The potty training device, in brief, comprises all the embodiments and modifications coming within the scope and spirit of the following claims.

I claim:

1. A training device for entertaining and encouraging a person to sit comfortably for a period of time while toilet training, the device comprising, in combination:
   a. a chair member having a seat portion having a central opening therein for the passage of excrement, a back portion attached to the seat portion, and a pair of arms, each of the arms being attached to the seat portion and the back portion;
   b. an electrically powered music box attached to the chair member for producing a musical tune;
   c. means for manually activating the music box attached to the chair member, the activating means being in electrical communication with the music box and comprising an electrical switch having a music activator button for manually actuating the switch, the button being located on an exterior surface of at least one of the arms; and
   d. light emitting diodes attached to the chair member, the light emitting diodes being in electrical communication with the music box to cause the light emitting diodes to blink to correspond to the musical tune.

2. The training device of claim 1, further comprising:
   e. an on/off switch attached to the chair member and in electrical communication with the music box to permit control by an adult supervisor.

3. The training device of claim 1, wherein the chair member further comprises means for removably mounting the training device to a toilet seat of an adult toilet to permit excrement to pass directly through the central opening of the chair member and into the adult toilet.

4. The training device of claim 1, further comprising:
   e. a base unit; the chair member being removably mounted on the base unit; and
   f. a receptacle for elimination of excrement removably housed in the base unit.

5. The training device of claim 1, wherein the chair member further comprises a central opening lid cover attached to the seat portion for selective overlaying of the central opening.

* * * * *